(12) United States Patent
Mormino et al.

(10) Patent No.: US 12,216,731 B2
(45) Date of Patent: Feb. 4, 2025

(54) CONTROLLING VIEWS OF A WEBSITE ON A BROWSER

(71) Applicant: Klaviyo, Inc, Boston, MA (US)

(72) Inventors: Noah Mormino, Covington, LA (US); Jonathan Darby, Atlanta, GA (US); Bjorn Mann, Walpole, NH (US)

(73) Assignee: Klaviyo, Inc, Boston, MA (US)

( * ) Notice: Subject to any disclaimer, the term of this patent is extended or adjusted under 35 U.S.C. 154(b) by 0 days.

(21) Appl. No.: 18/128,540

(22) Filed: Mar. 30, 2023

(65) Prior Publication Data

US 2024/0330395 A1    Oct. 3, 2024

(51) Int. Cl.
     *G06F 16/954*      (2019.01)
     *G06F 16/958*      (2019.01)

(52) U.S. Cl.
     CPC .................. *G06F 16/986* (2019.01)

(58) Field of Classification Search
     CPC ...................................... G06F 16/986
     See application file for complete search history.

(56) References Cited

U.S. PATENT DOCUMENTS

| | | | |
|---|---|---|---|
| 7,712,033 B2 | 5/2010 | Shafron | |
| 8,788,653 B2 | 7/2014 | Niemela | |
| 8,893,294 B1 * | 11/2014 | Steele, III | G06F 16/9577 726/22 |
| 10,503,912 B1 | 12/2019 | Kerr | |
| 2006/0090139 A1 * | 4/2006 | Jenni | G06F 40/143 715/764 |
| 2006/0129937 A1 * | 6/2006 | Shafron | G06F 16/957 715/744 |
| 2007/0067418 A1 * | 3/2007 | Isaacs | G06F 16/972 709/219 |
| 2011/0202829 A1 * | 8/2011 | Klassen | G06F 16/9577 715/243 |
| 2011/0270959 A1 * | 11/2011 | Schlusser | H04L 65/70 709/223 |
| 2012/0191546 A1 | 7/2012 | Phelan et al. | |
| 2014/0032652 A1 | 1/2014 | Hu et al. | |
| 2015/0227962 A1 | 8/2015 | Wical et al. | |
| 2015/0268949 A1 * | 9/2015 | Huber | G06F 16/958 717/120 |
| 2016/0117717 A1 | 4/2016 | Moreau et al. | |
| 2016/0189176 A1 | 6/2016 | Newnham | |
| 2016/0342299 A1 | 11/2016 | Lin-Hendel | |

(Continued)

*Primary Examiner* — Hope C Sheffield
(74) *Attorney, Agent, or Firm* — Brian R. Short

(57) ABSTRACT

Apparatuses, methods, and systems for controlling views of a website. One method includes generating selected variant data including data of the A view and data of the B view, providing the selected variant data including data of an A view or data of a B view to a state management library, generating, by the state management library, a UI (user interface) of a website based on the data of the A view data or the data of the B provided to the state management library, controlling displaying underlying data of a website view on a user browser based on the UI generated by the state management library, wherein the website view is generated by a front-end framework, wherein the front-end framework provides input to a website DOM which controls the website view on the user browser, and manipulating views of the website with the front-end framework based on the selected variant data.

15 Claims, 6 Drawing Sheets

(56) References Cited

U.S. PATENT DOCUMENTS

| | | |
|---|---|---|
| 2017/0046180 A1* | 2/2017 | Desineni .................... G06F 9/54 |
| 2018/0082326 A1 | 3/2018 | Vlassis et al. |
| 2018/0173390 A1* | 6/2018 | Dunne .................. G06F 3/0481 |
| 2019/0122254 A1 | 4/2019 | Duquette et al. |
| 2019/0342367 A1* | 11/2019 | DeLuca .............. G06F 16/9577 |
| 2020/0327577 A1 | 10/2020 | Truong et al. |
| 2021/0109897 A1 | 4/2021 | Brechbuhl et al. |
| 2022/0283932 A1 | 9/2022 | Arbour et al. |

* cited by examiner

Generating, by a server, selected variant data including data of an A view and data of a B view
610

Providing the selected variant data, by a variant selector, including the data of the A view data or the data of the B view to a state management library
620

Generating, by the state management library, a UI of a website based on the data of the A view data or the data of the B provided to the state management library
630

Controlling displaying, by a website DOM, underlying data of a website view on a user (customer) browser based on the UI generated by the state management library, wherein the website view is generated by a front-end framework, wherein the front-end framework provides input to the website DOM which controls the website view on the user (customer) browser
640

Manipulating views of the website with the front-end framework based on the selected variant data
650

*FIG. 6*

CONTROLLING VIEWS OF A WEBSITE ON A BROWSER

FIELD OF THE DESCRIBED EMBODIMENTS

The described embodiments relate generally to intelligent website management. More particularly, the described embodiments relate to systems, methods, and apparatuses for controlling views of a website on a browser of a computing device.

BACKGROUND

Website operators may want to test different views of a website.

It is desirable to have methods, apparatuses, and systems for controlling views of a website on a browser.

SUMMARY

An embodiment includes a computer-implemented method for displaying an A view and a B view on a single page application. The method includes generating, by a server, selected variant data including data of the A view and data of the B view, providing the selected variant data, by a variant selector, including the data of the A view data or the data of the B view to a state management library, generating, by the state management library, a UI (user interface) of a website based on the data of the A view data or the data of the B provided to the state management library, controlling displaying, by a website DOM (document object model), underlying data of a website view on a user (customer) browser based on the UI generated by the state management library, wherein the website view is generated by a front-end framework, wherein the UI framework provides input to the website DOM which controls the website view on the user (customer) browser, and manipulating views of the website with the UI framework based on the selected variant data.

Another embodiment includes a system for displaying an A view and a B view on a single page application of a computing device. The system includes a plurality of computing devices including the computing device, and a server connected through a network to the plurality of computing devices. For an embodiment, the server is configured to generate selected variant data including data of the A view and data of the B view. For an embodiment, the computing device is configured to generate the state management library a UI (user interface) of a website based on the data of the A view data or the data of the B provided to the state management library, control displaying, by a website DOM (document object model) of the computing device, underlying data of a website view on the web browser based on the UI generated by the state management library, wherein the website view is generated by a front-end framework of the web browser of the computing device, wherein the front-end framework provides input to the website DOM which controls the website view on the user (customer) browser, and manipulate views of the website with the front-end framework based on the selected variant data.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method for controlling views of a website on a browser, according to an embodiment.

DETAILED DESCRIPTION

The embodiments described include methods, apparatuses, and systems for controlling views of a website on a browser of a user. For an embodiment, views are controlled to enable A/B testing of the views of the website.

Figure 1:
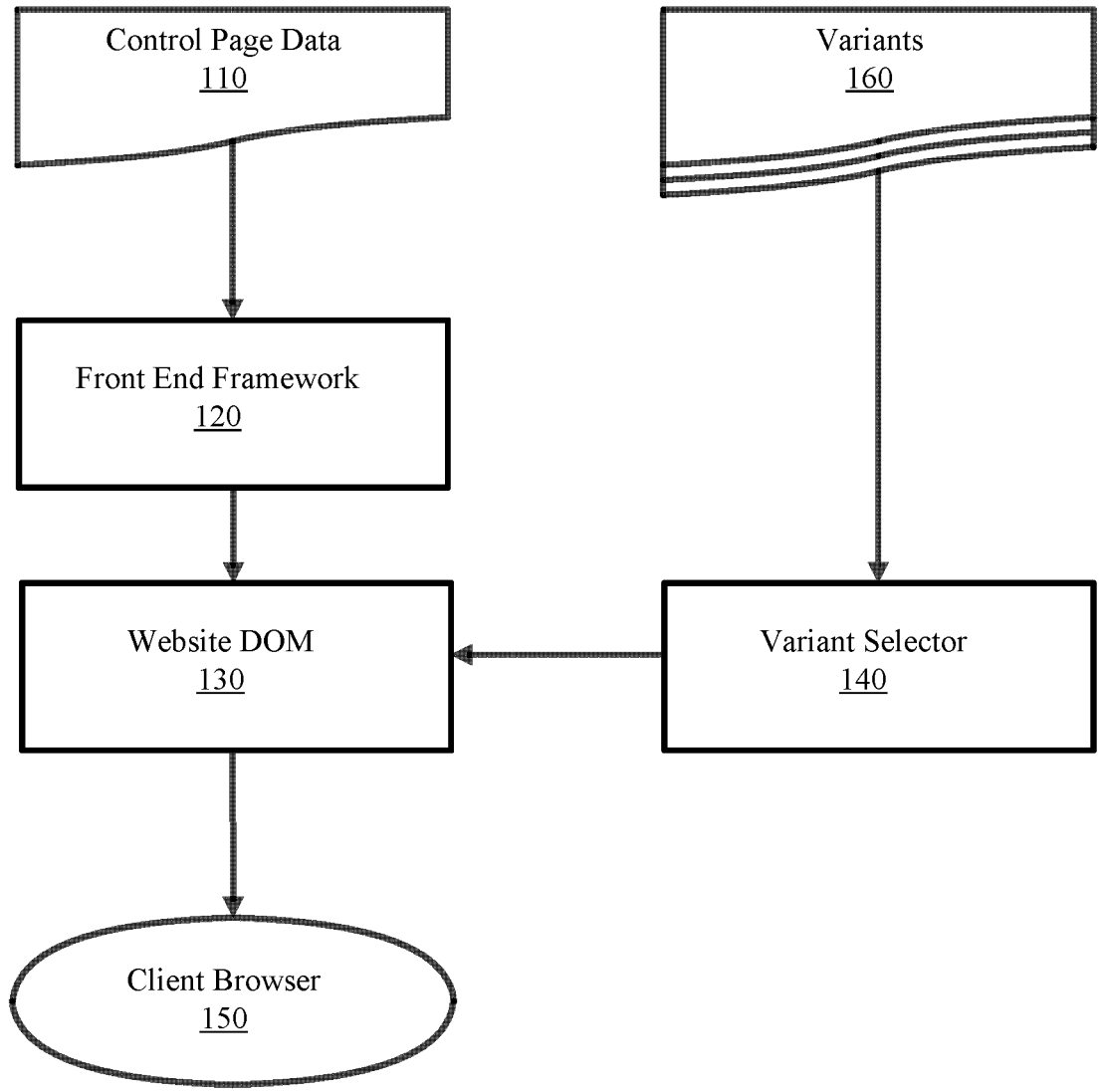
FIG. 1 shows a system for controlling views of a website on a browser, according to an embodiment.

FIG. 1 shows a system for controlling views of a website on a browser, according to an embodiment. As shown, a client browser 150 is controlled by a website DOM (document object model) 130. More specifically, the website DOM 130 controls underlying data of a website view on the client browser 150. As shown, for an embodiment, the website DOM 130 receives inputs from a front-end framework 120 and a test variant selector 140. As shown, the DOM 130 is updated directly by the test variant selector 140. For an embodiment, the DOM includes a programming API (Application Programming Interface) for HTML (HyperText Markup Language). For an embodiment, the DOM defines the logical structure of documents and the way a document is accessed and manipulated.

A control page data 110 comes from a content management system (for example, Wordpress©, Sanity©, Expression Engine©, Drupal©) and provides inputs to the front-end framework 120. Test variants 160 are provided directly to the test variant selector 140.

The embodiment of FIG. 1 has some undesirable features. More specifically, the embodiment of FIG. 1 involves manipulating the user interface of the website per the website DOM 130 directly. This poses challenges related to dynamic experiences like those built upon the front-end framework 120, such as React®, Vue®, Angular®, or others. A component is rendered based on the data provided to the front-end framework 120. For an embodiment, the component allows the UI (user interface) to be split into independent, reusable pieces in insolation. The data provided may be referred to as the component's state.

For at least some embodiment, interactive components such as accordions, carousels, forms etc. may experience re-renders multiple times while a user interacts with them. If the DOM 130 related to one of these components is modified directly, those modifications can break the ability of a user of the client browser 150 to interact with the component. For example, replacing a "Next" button of a carousel with a new button can result in the new button not working. Further, the modification may be lost when an interaction triggers a re-render, such as, clicking the "Next" button of a carousel. Further, A/B testing providers using a UI based editor do not have access to the underlying site components. This can create a huge engineering burden as recreating a component using the UI-based editor requires keeping duplicated libraries of components up to date. Further, content managers relying on a secondary platform for creating variants are forced to become familiar with multiple methods of content management.

Figure 2:
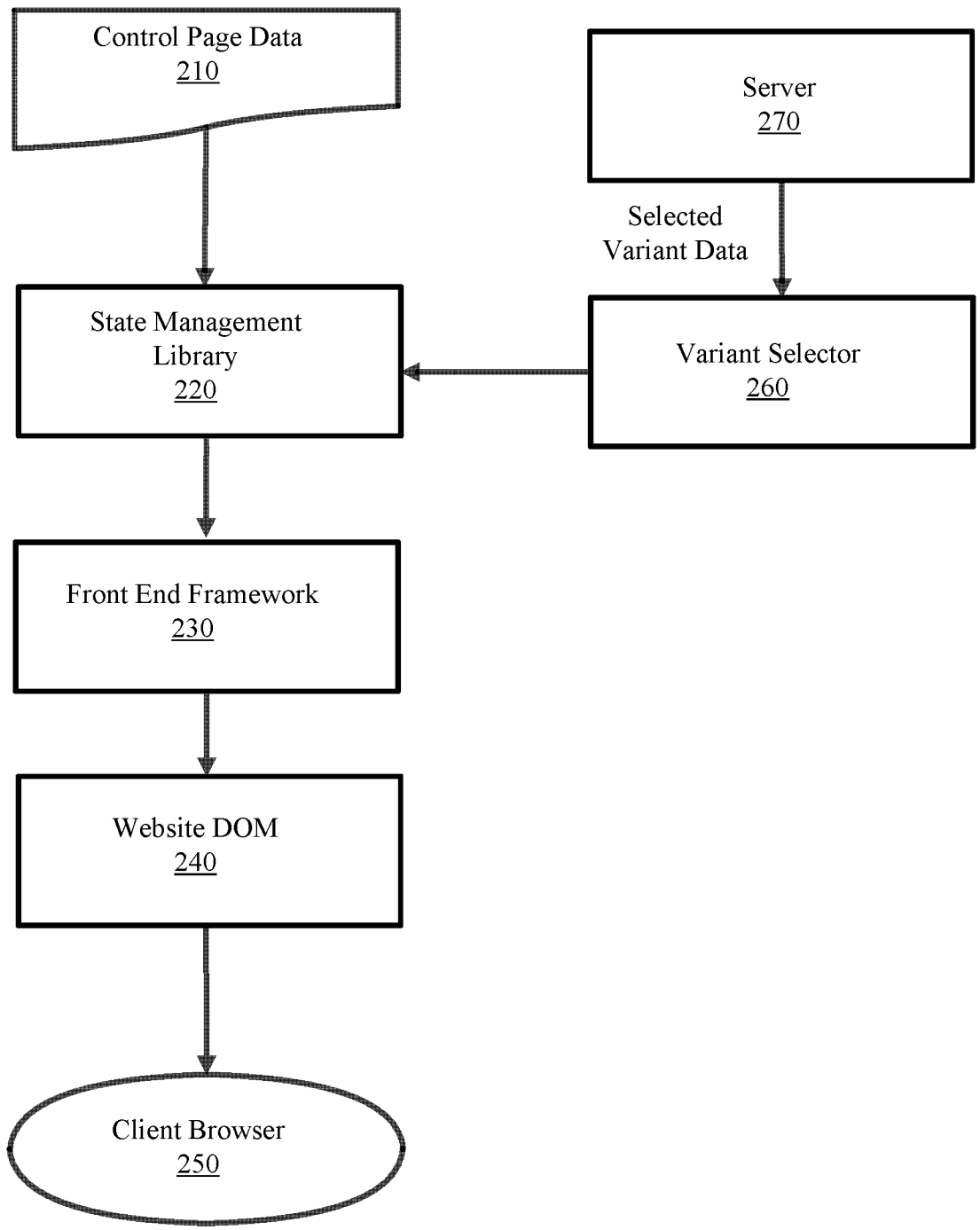
FIG. 2 shows a system for controlling views of a website on a browser, according to another embodiment.

FIG. 2 shows a system for controlling views of a website on a browser, according to another embodiment. This embodiment addresses the above-listed limitations of the embodiment of FIG. 1. The embodiment of FIG. 2 allows an editor to create website views as the editor would like to see them using existing components, and confidently test pages.

As shown a website DOM 240 controls underlying data of a website view of a website on a client (user) browser 250. For an embodiment, the user is a customer. Further, as shown, for an embodiment, the website view is generated by a front-end framework (React, VucJS, Angular, etc.) 230. A server 270 is configured to generate selected variant data including data of the A view and data of the B view. A variant selector 260 is configured to provide the selected variant data including the data of the A view data or the data of the B view to a state management library 220. The state management library 220 is configured to generate a UI of the website based on the data of the A view data or the data of the B. The views of the website are manipulated with the front-end framework 230 based on the selected variant data, wherein the UI framework 230 provides input to the website DOM 240 which controls the website view on the client (user) browser 250. A control page data 210 provides inputs to the state management library 220. Similar as described with FIG. 1, a component is rendered based on the data provided to the front-end framework 120, and the component lets the UI to be split into independent, reusable pieces. Conceptually, components are like JavaScript functions. They accept arbitrary inputs (called "props") and return React elements describing what should appear on the client browser.

In contrast to the embodiment of FIG. 1, the embodiment of the state management library 220 of FIG. 2 is configured to manipulate the data layer of the front-end framework 230 and trigger a re-rendering using the selected variant data. The embodiment of FIG. 1 is configured to manipulate the website DOM directly, whereas the embodiment of FIG. 2 manipulates the website DOM 240 indirectly through the state management library 220 and the front-end framework 230.

The embodiment of FIG. 2 overcomes the problems with the DOM manipulation method of front-end A/B testing on React, VueJS, Angular, and other state-based front-end libraries as shown in FIG. 1. The state management library 220 selects a data set variant, and the website DOM 240 is not updated directly which avoids the interaction re-render problems associated with interactive components of FIG. 1. Further, page variants are managed in the data source via the state management library 220. Therefore, A/B test variants are provided access to the same interface and components used by other pages. Further, page variants are managed in the data source via the first party page variant system, which provides content editors a single interface for creating pages and their associated variants.

For an embodiment, the state management library 220 operates on the front end (for example, on the client browser), and operates within or alongside the front-end framework 230. For an embodiment, the state management library includes or is similar to a small database that contains the values needed to render a specific component. For an embodiment, when data within the state management library is manipulated (by, for example, the variant selector 260 or the control page data 210) the client browser will re-render. For an embodiment, a payload of all possible variants is delivered to the client browser at the time a page is loaded and can swap (change the selection) between variants based on characteristics of the computing device or browser. For example, variants can be selected based on such characteristics, such as, a computing device location, an IP address, a screen size or resolution, and/or a configured language, without an additional network request. While the described embodiments may slightly increase the upfront payload by including all the different selectable variants options upfront, ultimately time is saved and efficiency improved by eliminating the need for additional network requests.

Figure 3:
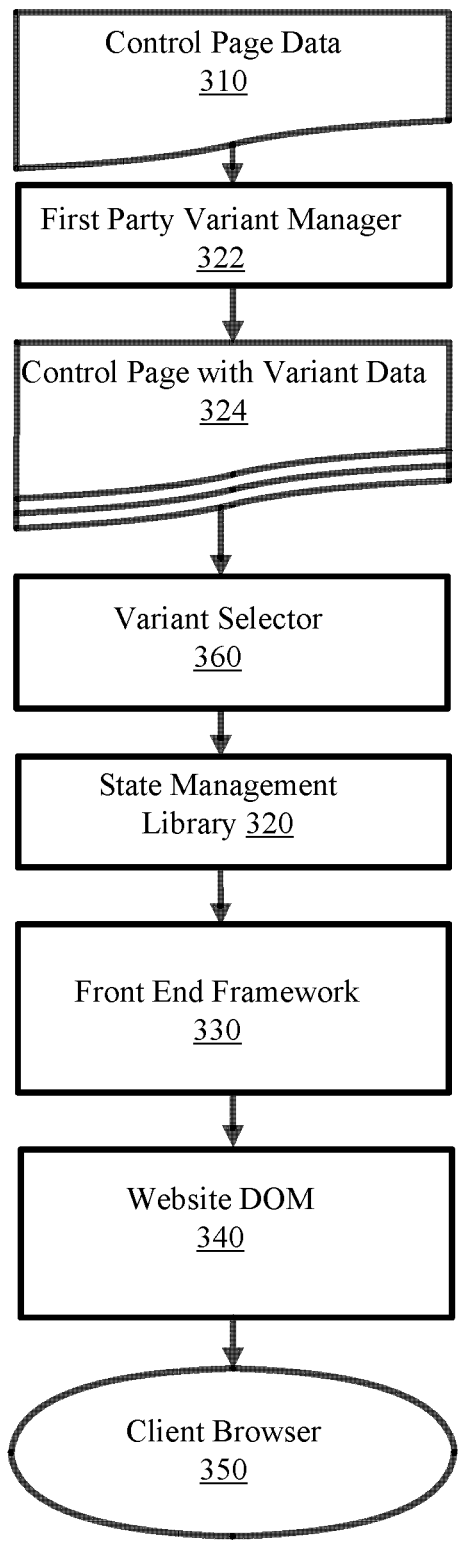
FIG. 3 shows a system for controlling views of a website on a browser, according to another embodiment.

FIG. 3 shows a system for controlling views of a website on a browser, according to another embodiment. Again, in contrast to the embodiment of FIG. 1, the embodiment of the state management library 320 of FIG. 3 is configured to manipulate the data layer of the front-end framework 330 and trigger a re-rendering using the selected variant data. The website DOM 340 is manipulated indirectly through the state management library 320 and the front-end framework 330. Here, the variant selector 360 is configured to select and to provide the selected variant data including the data of the A view data or the data of the B view to the state management library 320.

Control data is generated by control page data 310 and variant data is provided by a first party variant manager 322. The control page and variant data is provided to the variant selector 360 via control page and variant data 324. Again, the variant selector 360 is configured to select and to provide the selected variant data including the data of the A view data or the data of the B view to the state management library 320.

For an embodiment, the A view is a control view, and the B view is a variant view. That is, for an embodiment, the A view is control page data 310, and the B view is variant data of the first party variant manager 324. Further, the variant data of the first party variant manager 324 can include a C view, a D view, etc. For an embodiment, a shape of the A view object and any subsequent views follow the same general template. For an embodiment, the A view or control view, is also a potential variant that can be selected.

For an embodiment, the state management library (220, 320) manipulates a data layer of the front-end framework (230, 330), thereby triggering a re-rendering using the selected variant data. For an embodiment, the state management library (220, 320) stores the current state, or contents of a given page. When the variant selector 360 selects a new variant (such as, a B view or a C view), the contents of that new variant overwrite the existing contents. For an embodiment, the overwriting of the existing contents triggers a re-rendering of the website view (collection of components that make up a page) of a given page to show the new variant contents. Use cases for the described embodiments include support for activities, such as, A/B testing and personalization of web contents based on end user data.

As previously described, for an embodiment, the state management library 220, 320 operates on the front end (for example, on the client browser), and operates within or alongside the front end framework 230, 330. For an embodiment, the state management library 220, 320 includes or is similar to a small database that contains the values needed to render a specific component. For an embodiment, when data within the state management library 220, 320 is manipulated (by, for example, the variant selector 260, 360 or the control page data 210, 310) the client browser 250, 350 will re-render. For an embodiment, a payload of all possible variants is delivered to the client browser 250, 350 at the time a page is loaded and can swap (change the selection) between variants based on characteristics of the computing device or browser. For example, variants can be selected based on such characteristics, such as, a computing device location, an IP address, a screen size or resolution, and/or aa configured language, without an additional network request. While the described embodiments may slightly increase the upfront payload by including all the different selectable variants options upfront, ultimately time is saved an efficiency improved by eliminating the need for additional network requests.

As will be described, for an embodiment, the state management library (220, 320) operates on the user (customer) browser 350. For an embodiment, when the user loads a webpage, the state management library (220, 320) is loaded in through a javascript bundle and utilized within the browser of the user.

Further, as will be described, for an embodiment, the variant selector (260, 360) operates on the user (customer) browser 350. For an embodiment, the variant selected is a javascript function that is delivered to the browser via the javascript bundle and is used to adjust the contents within the state management library (220, 320).

For an embodiment, the state manager library is configured to hold view data for a given view (A view, B view, C view, etc.). For an embodiment, while the front-end website of the client browser has access to all variant data, the state management library (220, 320) only contains a single instance of a view for a given page as selected by the variant selector (260, 360).

For an embodiment, the A view and the B view are linked to create a consistent relationship between a data set of the A view and a dataset of the B view. For an embodiment, when the variants are delivered to a single page application, each page along with the variants of each page is contained within the same control id. An example of how the JSON string of a data set might look to facilitate the variants for a control:

{"variants":["variant a": {contents}, "variant b": {contents}, "variant c": {contents} ].

For an embodiment, the consistent relationship includes durable across user sessions, wherein a user (customer) is exposed to either the A view A data or the B view from a same data set options. For an embodiment, when either A view or B view are loaded, all linked views are returned as a set. For example:

{"variants":["variant a", "variant b", "variant c"]}<this represents the return set.

For an embodiment, the variant selector (260, 360) includes a function, or set of functions, which can accept a variant as an argument (input to the function(s)) and updates the state management library (220, 320) for a given page with corresponding view data (A view data or B view data). For at least some embodiments, when a page is rendered, the client browser makes a network request and obtains the page data and all its associated variants. For an embodiment, by default, variant A is displayed. For an embodiment, when the variant selector function is called, the variant selector function takes a variant ID as a property. For an embodiment, the variant selector function then obtains the corresponding variant and overwrites the data for the given page in the state management library. At this point in time, the page will re-render with the selected variant content.

For an embodiment, the front-end Framework (230, 330) includes a set of tools, practices, and documentation to build website interfaces. For an embodiment, the UI Framework is the set of classes and interfaces that define the elements and behavior of a window-based UI Subsystem. For an embodiment, the front-end Framework (230, 330) defines a structure for defining user interfaces.

For an embodiment, the Website DOM (240, 340) provides a visual representation of an underlying data structure in the user (customer) browser. As previously described, for an embodiment, the website DOM receives inputs from a front-end framework and the test variant selector. For an embodiment, the website DOM is updated directly by the test variant selector. For an embodiment, the DOM includes a programming API (Application Programming Interface) for HTML (HyperText Markup Language). For an embodiment, the DOM defines the logical structure of documents and the way a document is accessed and manipulated.

A control page data (210, 310) provides inputs to the front-end framework (230, 330) via the state management library (220, 320). Test variants are provided directly to the test variant selector (260, 360).

Figure 4:
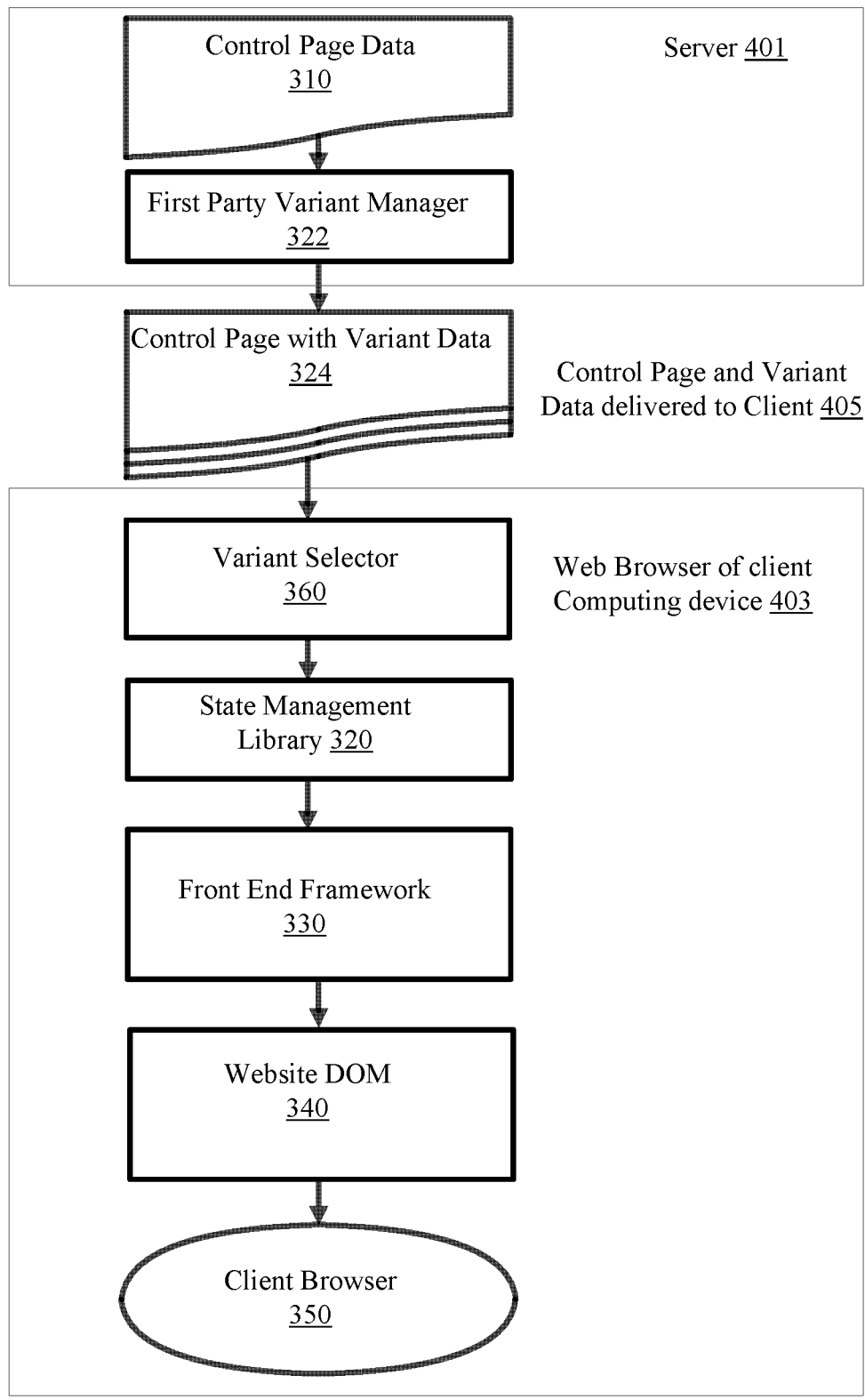
FIG. 4 shows a system for controlling views of a website on a browser, according to another embodiment.

FIG. 4 shows a system for controlling views of a website on a browser, according to another embodiment. The embodiment of FIG. 4 provides an example of where the processing of each of the components of the described embodiment are located. As shown, for an embodiment, the control page data 310 and the first party variant manager 322 are functionally located within a server 401.

For an embodiment, the control page with variant data 324 is generated by the server and provided to the web browser of the client computing device 403.

As shown in FIG. 4, for an embodiment, the variant selector 340 and the state management library 320 operate on the web browser 350 of the user client. As previously described, for an embodiment, the state management library 320 operates on the user (customer) browser 350. For an embodiment, when the user loads a webpage, the state management library 320 is loaded in through a javascript bundle and utilized within the browser of the user. Further, as previously described, for an embodiment, the variant selector 340 operates on the user (customer) browser 350. For an embodiment, the variant selected is a javascript function that is delivered to the browser 350 via the javascript bundle and is used to adjust the contents within the state management library 320.

For at least some embodiments, the front end framework 320 and the website DOM 330 are configured to operate on the computing device 403.

Figure 5:
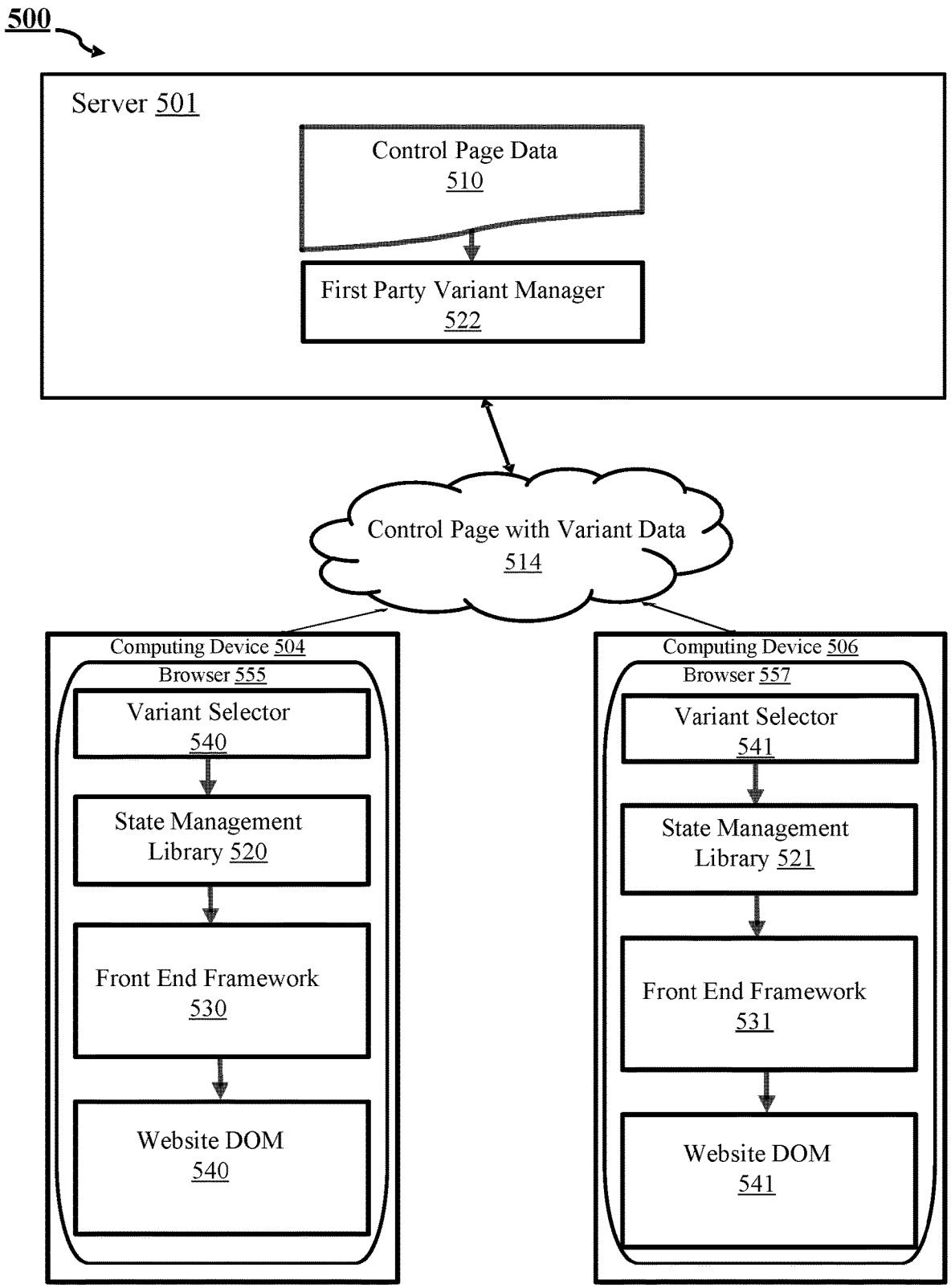
FIG. 5 shows a system for controlling views of a website on a browser that further depicts where processing of the controlling may be located, according to an embodiment.

FIG. 5 shows a system for controlling views of a website on a browser that further depicts where processing of the controlling may be located, according to another embodiment. As shown, for an embodiment, the control page data 510 and the first party variant manager 522 are functionally located within a server 501.

For an embodiment, the control page with variant data is generated by the server and provided to the web browser of the client computing devices 504, 506 through a network 514.

For an embodiment, a variant selector 540 and a state management library 520 are delivered to and operate on the web browser 555 of the computing device 504, and a variant selector 541 and a state management library 521 are delivered to and operate on the web browser 557 of the computing device 506. For an embodiment, each browser 555, 557 of each of the computing devices 504, 506 have the same variants delivered to them. However, for at least some embodiments, the variant selected for one user of one browser of one computing device may not be the same as the variant selected from another of another browser of another computing device. That is, for an embodiment, there is no synchronicity between users of different computing devices. For an embodiment, each visitor (user of a computing device) to the website will have the same variants delivered to them where variants are present. For an embodiment, the variant selected for a particular user may or may not be the same as another user visiting the site. There is no synchronicity between visiting users.

For an embodiment, the state management libraries 520, 521 operate on the front end (for example, on the client browsers 555, 557), and operate within or alongside the front end frameworks 530, 531. For an embodiment, the state management libraries 520, 521 include or are similar to a small database that contains the values needed to render a specific component. For an embodiment, when data within the state management libraries 520, 521 is manipulated, the client browsers 555, 557 will re-render. For an embodiment, a payload of all possible variants is delivered to the client browsers at the time a page is loaded and can swap between variants based on characteristics of the computing devices 504, 506 or browsers 555, 557. For example, variants can be selected based on such characteristics, such as, a computing device location, an IP address, a screen size or resolution, and/or a configured language, without an additional network request. While the described embodiments may slightly increase the upfront payload by including all the different selectable variants options upfront, ultimately time is saved and efficiency improved by eliminating the need for additional network requests.

FIG. 6 is a flow chart that includes steps of a method for controlling views of a website on a browser, according to an embodiment. A first step 610 includes generating, by a server, selected variant data including data of an A view and data of a B view. A second step 620 includes providing the selected variant data, by a variant selector, including the data of the A view data or the data of the B view to a state management library. A third step 630 includes generating, by the state management library, a UI of a website based on the data of the A view data or the data of the B provided to the state management library. A fourth step 640 includes controlling displaying, by a website DOM, underlying data of a website view on a user (customer) browser based on the UI generated by the state management library, wherein the website view is generated by a front-end framework, wherein the front-end framework provides input to the website DOM which controls the website view on the user (customer) browser. A fifth step 650 includes manipulating views of the website with the front-end framework based on the selected variant data. This embodiment includes manipulating the data layer of the front-end framework which triggers re-rendering of views of the website using the selected variant data.

For an embodiment, the server (such as, server 401, 501) includes a non-transitory computer-readable storage medium with program instructions stored thereon. The program instructions when executed by one or more processors of the server are operable to cause the one or more processors to perform operations including the steps of the method of FIG. 6. For an embodiment, it is to be understood that the server may include a plurality of network connected server that perform the steps of the method of FIG. 6.

As previously described, for an embodiment, the A view is a control view, and the B view is a variant view. That is, for an embodiment, the A view is control page data 310, and the B view is variant data of the first party variant manager 324. Further, the variant data of the first party variant manager 324 can include a C view, a D view, etc. For an embodiment, a shape of the A view object and any subsequent views follow the same general template. For an embodiment, the A view or control view, is also a potential variant that can be selected by the variant selector.

As previously described, for an embodiment, the state management library manipulates a data layer of the front-end framework, thereby triggering a re-rendering using the selected variant data. For an embodiment, the state management library (220, 320) stores the current state, or contents of a given page. When the variant selector 360 selects a new variant (such as, a B view or a C view), the contents of that new variant overwrite the existing contents. For an embodiment, the overwriting of the existing contents triggers a re-rendering of the website view of a given page to show the new variant contents.

As previously described, for an embodiment, the state management library operates on the user (customer) browser. For an embodiment, when the user loads a webpage, the state management library is loaded in through a javascript bundle and utilized within the browser of the user. Further, as previously described, for an embodiment, the variant selector 340 operates on the user (customer) browser. For an embodiment, the variant selected is a javascript function that is delivered to the browser via the javascript bundle and is used to adjust the contents within the state management library.

As previously described, for an embodiment, the state manager library is configured to hold view data for a given view (A view, B view, C view, etc.). For an embodiment, while the front-end website of the client browser has access to all variant data, the state management library only contains a single instance of a view for a given page as selected by the variant selector.

As previously described, for an embodiment, the A view and the B view are linked to create a consistent relationship between a data set of the A view and a dataset of the B view. For an embodiment, when the variants are delivered to a single page application, each page along with the variants of each page is contained within the same control:

{"variants":["variant a": {contents}, "variant b": {contents}, "variant c": {contents}]

As previously described, for an embodiment, the consistent relationship includes durable across user sessions, wherein a user (customer) is exposed to either the A view A data or the B view from a same set of data options. For an embodiment, when either A view or B view are loaded, all linked views are returned as a set. For example:

{"variants":["variant a", "variant b", "variant c"]}<this represents the return set.

As previously described, for an embodiment, the variant selector includes a function, or set of functions, which can accept a variant as an argument (input to the function(s)) and updates the state management library for a given page with corresponding view data (A view data or B view data). For at least some embodiments, when a page is rendered, the client browser makes a network request and obtains the page data and all its associated variants. For an embodiment, by default, variant A is displayed. For an embodiment, when the variant selector function is called, the variant selector function takes a variant ID as a prop. For an embodiment, the variant selector function then obtains the corresponding variant and overwrites the data for the given page in the state management library. At this point in time, the page will re-render with the selected variant content.

For an embodiment, a payload of all possible variants including the A view and the B view is delivered to the user browser when a page is loaded, and wherein a one of the variants is selected based on characteristics of the user browser or of a computing device of the user browser. For an embodiment, the characteristics include at least one of a computing device location, an IP address, a screen size or resolution, or a configured language. As previously stated, for an embodiment, a payload of all possible variants is delivered to the client browser 250, 350 at the time a page is loaded and can swap (change the selection) between variants based on characteristics of the computing device or browser. As described, for example, variants can be selected based on such characteristics, such as, a computing device location, an IP address, a screen size or resolution, and/or aa configured language, without an additional network request.

As previously described, for an embodiment, the front-end Framework includes a set of tools, practices, and documentation to build website interfaces.

As previously described, for an embodiment, the Website DOM provides a visual representation of an underlying data structure in the user (customer) browser.

Although specific embodiments have been described and illustrated, the embodiments are not to be limited to the specific forms or arrangements of parts so described and illustrated. The described embodiments are to only be limited by the claims.

What is claimed:

1. A method of displaying an A view and a B view on a single page application comprising:
   generating, by a server, selected variant data including data of the A view and data of the B view;
   downloading a state management library and a variant selector to user browsers of each of a plurality of computing devices that access a website, wherein the state management library and the variant selector operate on each user browser of each of the plurality of computing devices after being downloaded;
   downloading, to each web browser of each of the plurality of computing devices, a payload of all possible variants including data of the A view and data of the B view at times a web page is loaded to each web browser of each of the plurality of computing devices from the server;
   selecting, by each variant selector of each of web browsers, downloaded data of the A view or downloaded data of the B view based on at least on a configured language of a computing device of each web browser;
   providing the selected variant data, by the variant selector of each of the web browsers, including the data of the A view or the data of the B view to the state management library of each of the web browsers, wherein each variant selector obtains a corresponding downloaded and selected data of the A view or downloaded and selected data of the B view and overwrites data for a page in each state management library with the downloaded and selected data of the A view or the downloaded and selected data of the B view, thereby re-rendering by the page with the corresponding downloaded and selected data of the A view or the downloaded and selected data of the B view, wherein the corresponding downloaded and selected data of the A view or the downloaded and selected data of the B view for each of the web browsers is independent of the corresponding downloaded and selected data of the A view or the downloaded and selected data of the B view for each other of the web browsers;
   generating, by the state management library, a UI (user interface) of the website based on the downloaded and selected data of the A view or the downloaded and selected data of the B selected by the variant selector and provided to the state management library;
   controlling displaying, by a website DOM (document object model), underlying data of a website view on each user browser based on the UI generated by the state management library;
   wherein the website view is generated by a front-end framework, wherein the front-end framework provides input to the website DOM which controls the website view on the user browser, wherein the state management library provides either the downloaded and selected data of the A view or the downloaded and selected data of the B view to the front-end framework as selected by the variant selector; and
   manipulating views of the website with the front-end framework based on the selected variant data.

2. The method of claim 1, wherein the A view is a control view, and the B view is a variant view.

3. The method of claim 1, wherein the state management library manipulates a data layer of the front-end framework, thereby triggering a re-rendering using the selected variant data.

4. The method of claim 1, wherein the state manager library is configured to hold view data for a given view, wherein the state management library only contains a single instance of the A view or the B view for the page as selected by the variant selector.

5. The method of claim 1, wherein the A view and the B view are linked to create a consistent relationship between a data set of the A view and a dataset of the B view.

6. The method of claim 5, wherein the consistent relationship comprises durable across user sessions, wherein a user is exposed to either the A view A data or the B view from a same set of data options.

7. The method of claim 1, wherein the variant selector comprises a function, or set of functions, which can accept a variant as an argument and updates the state management library for a given page with corresponding view data including the A view data or the B view data.

8. The method of claim 1, wherein a one of the variants is selected based on characteristics of a computing device of the user browser.

9. The method of claim 8, wherein the characteristics include a computing device location, an IP address, a screen size or resolution, and the configured language.

10. A system of displaying an A view and a B view on a single page application of a computing device, comprising:
    a plurality of computing devices including the computing device;
    a server connected through a network to the plurality of computing devices;
    the server configured to:
       generate selected variant data including data of the A view and data of the B view;
       download a state management library and a variant selector to user browsers of each of a plurality of computing devices that access a website, wherein the state management library and the variant selector operate on each user browser of each of the plurality of computing devices after being downloaded;
       download to each web browser of each of the plurality of computing devices, a payload of all possible variants including data of the A view and data of the B view at times a web page is loaded to each web browser of each of the plurality of computing devices from the server;
    the computing device configured to:
       select by the variant selector of the web browsers of the computing device downloaded data of the A view or downloaded data of the B view based on at least on a configured language of the computing device;

provide the selected variant data, by the variant selector of the web browser of the computing device, including the data of the A view or the data of the B view to the state management library of the web browser of the computing device, wherein each variant selector obtains a corresponding downloaded and selected data of the A view or downloaded and selected data of the B view and overwrites data for a page in each state management library with the downloaded and selected data of the A view or the downloaded and selected data of the B view, thereby re-rendering by the page with the corresponding downloaded and selected data of the A view or the downloaded and selected data of the B view, wherein the corresponding downloaded and selected data of the A view or the downloaded and selected data of the B view for each of the web browsers is independent of the corresponding downloaded and selected data of the A view or the downloaded and selected data of the B view for each other of the web browsers;

generate by the state management library a UI (user interface) of the website based on the downloaded and selected data of the A view data or the downloaded and selected data of the B selected by the variant selector and provided to the state management library;

control displaying, by a website DOM (document object model) of the computing device, underlying data of a website view on each user browser based on the UI generated by the state management library;

wherein the website view is generated by a front-end framework, wherein the front-end framework provides input to the website DOM which controls the website view on the user browser, wherein the state management library provides either the downloaded and selected data of the A view or of the downloaded and selected data of the B view to the front-end framework as selected by the variant selector; and manipulate views of the website with the front-end framework based on the selected variant data.

11. The system of claim 10, wherein the A view is a control view, and the B view is a variant view.

12. The system of claim 10, wherein the state management library manipulates a data layer of the front-end framework, thereby triggering a re-rendering using the selected variant data.

13. The system of claim 10, wherein the A view and the B view are linked to create a consistent relationship between a data set of the A view and a dataset of the B view, wherein a user is exposed to either the A view or the B view from a same set of data options, and wherein the state management library only contains a single instance of the A view or the B view for the page as selected by the variant selector.

14. The system of claim 10, wherein the variant selector comprises a function, or set of functions, which can accept a variant as an argument and updates the state management library for a given page with corresponding view data (A view data or B view data).

15. The system of claim 10, wherein a one of the variants is selected based on characteristics an IP address a computing device of the user browser.

* * * * *